June 24, 1930.  T. C. SCHENK  1,766,003
NUT AND BOLT ASSEMBLING MACHINE
Filed June 1, 1927
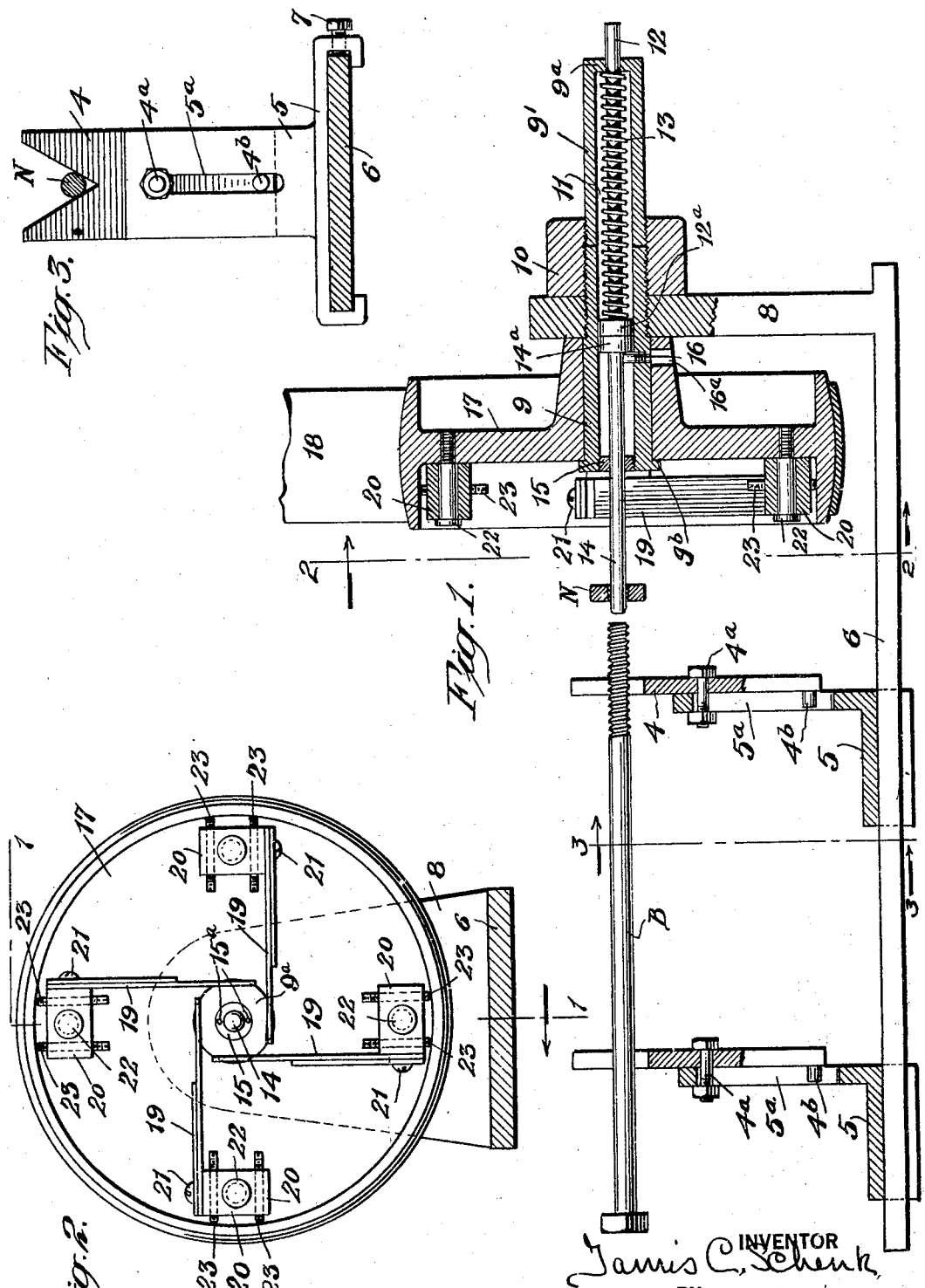
INVENTOR
James C. Schenk,
BY
Edwards & Hueby
ATTORNEY Patented June 24, 1930

1,766,003

UNITED STATES PATENT OFFICE

TAMIS C. SCHENK, OF BROOKLYN, NEW YORK

NUT AND BOLT ASSEMBLING MACHINE

Application filed June 1, 1927. Serial No. 195,626.

This invention relates to machines for applying nuts on bolts; and the invention aims to provide a simple and reliable machine or appliance for facilitating easy and rapid assembly of bolts and nuts, and a machine or appliance especially valuable in this regard where the bolts are of other than the smaller sizes.

An object of the invention is to provide a plurality of cooperant parts, involving bolt and nut supports or guides and a preferably continuously running means for screwing up a nut on its bolt; with these parts combined in such manner that, while they may be associated with automatic feeding means for bolts or nuts or both, said cooperant parts may nevertheless be provided to constitute a self-complete machine or appliance for handling bolts of such sizes that it is economical to employ attendants to manually position a nut on one of said supports or guides and a bolt on the other incidental to each screwing up of a nut on a particular bolt.

Another object is to provide, in an appliance of the kind just referred to, simple and practical adjusting means for readily adapting the appliance to handle bolts and nuts of different dimensions.

Another object is to provide, in such an appliance, a nut-screwing device, preferably a rotary one, provided with a nut-engaging instrumentality having a yieldable characteristic, whereby, when a nut is fully screwed up on its bolt, or, as is more usual, when the nut has been partially screwed up to a predetermined extent on its bolt, the nut-engaging instrumentality will thereupon idle while moving relatively to the nut, so that the nut-screwing means may operate continuously over a period during which a plurality of nuts are applied to their bolts.

Various other objects and advantages of the invention will be in part obvious and in part specifically referred to in the course of the following description of a preferred but merely illustrative form of the invention as shown in the accompanying drawing; it being understood, of course, that the scope of protection contemplated is to be taken from the appended claims.

In this drawing,

Fig. 1 is a longitudinal section, taken on line 1—1 of Fig. 2; and

Figs. 2 and 3 are transverse sections, taken, respectively, on lines 2—2 and 3—3 of Fig. 1.

Similar reference characters refer to similar parts throughout the several views of the drawing.

In the form of the invention thus illustrated:

A bolt support, such bolt being indicated at B, comprises a cradle structure made up of a pair of forked cradle plates 4, mounted on L-shaped supporting members 5.

The horizontal limbs of these members 5 are shaped as shown best in Fig. 3 to take about top, side and bottom portions of the table 6. Each of these members 5 is provided with a set screw as shown at 7 in Fig. 3 for anchoring each member 5 and thus for positioning the cradle in a definite location on the table.

At one end the table carries a standard 8, in which is secured horizontally a cylindrical housing 9, held in place by a lock nut 10.

This housing is hollow and has a cylindrical chamber 11. The rear end of said chamber is closed by a wall $9^a$, centrally apertured, through which is slidable a rod 12. The forward end of this rod, within chamber 11, carries a piston-like enlargement $12^a$; and a coil spring 13, sleeved about the rod and located between the piston $12^a$ and the wall $9^a$ normally resiliently holds the rod so that the piston $12^a$ is pressed against a similar piston $14^a$ on the rear end of another rod 14. This rod 14 is likewise slidable longitudinally of the housing 9, being guided at a point intermediate its ends by the central aperture in a removable wall-member or male nut 15 threaded into the front end of housing 9. It will be understood that the spring 13 acts through the elements $12^a$ and $14^a$ to maintain the rod 14 normally yieldingly projected as shown; further projection of the rod 14 being prevented by a threaded stop-pin 16.

The rod 14, where projected beyond the housing 9, constitutes a mandrel or support on which a nut may be loosely sleeved as indicated at N, preparatory to being screwed up on a bolt B.

On that part of housing 9 which lies between standard 8, and a flange 9ᵇ on the left end of the housing, is revolubly mounted a rotary device 17, in the present case a common type of cast-iron pulley, driven continuously by a belt 18.

This pulley 17 has mounted thereon a plurality of resilient or impositively acting fingers 19, here of leaf-spring form. These fingers are inwardly extended from end anchorage-blocks 20 as shown best in Fig. 2, so that their free or inner ends will seize and engage with some degree of tightness the flats of a nut when such nut is moved into the field of operation of the fingers.

Operation: With the pulley 17 rotating, a nut N is hung on the end of rod 14, and then a bolt is laid on the cradle 4—4 and this bolt is slid toward the right. A single rapid such sliding movement of the bolt results in, first, the left end of the rod 14 being engaged by the right end of the bolt, next, a movement of the bolt and rod 14 as one unit toward the right until the rod is projected beyond the housing 9 an amount just equal to the thickness of the nut N and until the nut is simultaneously brought into the field of operation of the fingers 19, and, next, a continuing pressure of the threaded end of the bolt against the threaded opening in the nut while the nut is being screwed up on the bolt by said fingers.

The instant the nut is fully screwed up on the bolt, or is screwed up on the bolt to the extent of two or three threads (if the threads are cut, as is often the case, so that wrench-power is needed to further assemble the bolt and nut), the resilient fingers 19 begin to slip past the flats of the nut. In doing so, they set up a clacking or deliver an audible alarm that the assembling operation is completed.

Thereupon, and if necessary following a sliding of the bolt to the left to clear the nut from the left end of rod 14, that is, if the nut has been only partially screwed up on the bolt, the final operation is performed of tilting or tossing the assembled bolt and nut off the cradle.

In order to adapt the cradle to align bolts of different shank diameters with the mandrel or support 14, the following parts are provided: Each forked or cradle plate 4 is mounted on its L-shaped base 5 by a pin and slot connection comprising, in the upright limb of the member 5, a slot as indicated at 5ᵃ, and an adjusting bolt 4ᵃ and a guiding pin 4ᵇ carried by the plate.

In order to permit the cradle also to be adjusted for bolts of different lengths, each base member 5 is slidable along the length of table 6, and each of such base members may be secured in the desired position on such table by means of its set screw 7 already referred to.

In order to permit the substitution of one sized mandrel or support 14 for another, to set the appliance for handling nuts corresponding to bolts of different shank diameters, a suitable plurality of substitute male nuts 15 are provided, having central apertures of different sizes, and the hub of pulley 17 is provided with a screw-driver hole 16ᵃ so located that when aligned with the stop-pin 16, the latter may be readily removed, as by applying the blade of the screw-driver to the kerf (not shown) at the outer end of said pin; this pin carrying a screw thread as illustrated so that the pin may be spirally removed. Male nut 15, as shown in Fig. 2 at 15ᵃ, may carry a plurality of depressions to facilitate the use of a tool in readily removing the same.

In order to permit the fingers 19 to be set for properly engaging the flats of nuts of different sizes, each block 20, on which the leaves of its finger 19 are mounted by a screw 21, is pivotally hung on a stud 22, and on opposite sides of the axis of said stud the block carries adjusting screws 23 the points of which bear against inner wall portions of the rim flange of the pulley. By properly setting these adjusting screws, each block 20 may be angularly adjusted on its stud 22 and locked in such adjustment, thereby to set the fingers 19 for coacting in the intended way with the flats of nuts of different sizes.

As illustrated, the housing 9 may be made up of two separate parts, the part marked 9 and the part marked 9' in Fig. 1; both these parts screwed up to a jam fit in the nut 10. Then the screw 16, if present, need not be touched, in order to substitute one mandrel on support 14 for another; since, for such substitution, the rear section 9' of the housing may be unscrewed, and said section and the parts 12 and 13 temporarily removed, so as to permit similar removal, through the open end of the housing section left in the machine, of the mandrel 14 for which another is to be substituted.

Inasmuch as many changes could be made in the above construction, and many apparently widely different embodiments of the invention could be made without departing from the scope thereof, it is intended that all matter contained in the above description or shown in the accompanying drawing shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. A machine for assembling nuts having peripheral flat faces and bolts, including the combination of a rotary device carrying a plurality of spring fingers for engaging the flats of the nut, a support for the bolt opposite said rotary device in which the same may be slid along its axis, and a movable support for the nut in line with the axis of the bolt, the bolt support guiding the bolt for movement toward the nut support to engage and move the latter and thereby bring the nut into the field of operation of said fingers.

2. A machine for assembling nuts and bolts, including the combination of a supporting and guiding means for a bolt sliding therein so that a bolt may be shifted in the direction of its axis and towards a nut, means for holding a nut approximately in the axis of the bolt and rotary and flexible means for engaging flats on the periphery of the nut and rotating the latter relative to the bolt when the bolt is shifted in the direction of the nut so as to screw the nut on the bolt.

TAMIS C. SCHENK.